US008129642B2

(12) United States Patent
Brouwer et al.

(10) Patent No.: US 8,129,642 B2
(45) Date of Patent: *Mar. 6, 2012

(54) HINGE ACTUATOR AND METHOD FOR ADJUSTING TWO PARTS OF A HINGE ACTUATOR RELATIVE TO EACH OTHER

(75) Inventors: Stefan Frits Brouwer, Schoonhoven (NL); Peter Alexander Hamming, Houten (NL); Andreas Johannes Petrus Schalkwijk, Woerden (NL); Eric Gerardus Paulus van Slagmaat, Woerden (NL); Paulus Gerardus Maria van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,630

(22) Filed: Dec. 3, 2010

(65) Prior Publication Data

US 2011/0068662 A1 Mar. 24, 2011

Related U.S. Application Data

(63) Continuation of application No. 12/472,935, filed on May 27, 2009, now Pat. No. 7,847,205, which is a continuation of application No. 11/499,201, filed on Aug. 4, 2006, now Pat. No. 7,547,855.

(51) Int. Cl.
*H01H 5/00* (2006.01)
(52) U.S. Cl. ..................... 200/405; 200/61.7
(58) Field of Classification Search .................. 200/405, 200/61.7
See application file for complete search history.

(56) References Cited

U.S. PATENT DOCUMENTS

| | | | | |
|---|---|---|---|---|
| 5,636,071 A | * | 6/1997 | Mochizuki et al. | 359/877 |
| 7,547,855 B2 | * | 6/2009 | Brouwer et al. | 200/405 |
| 7,847,205 B2 | * | 12/2010 | Brouwer et al. | 200/405 |

* cited by examiner

*Primary Examiner* — R S Luebke
*Assistant Examiner* — Lheiren Mae Caroc
(74) *Attorney, Agent, or Firm* — Dykema Gossett PLLC

(57) ABSTRACT

A hinge actuator includes a first part, a second part, an electric drive, a coupling, and an auxiliary coupling. The first part and second part are configured for connection via the electric drive. The coupling is provided between the first part and the second part such that, in a first position, the first part and the second part are connected via the drive and can be pivoted relative to each other via the drive, and, in a second position, the first part and the second part are not connected to each other via the drive and can be pivoted relative to each other manually. In an embodiment, first stops are included on the coupling and the auxiliary coupling, and second stops are included on the coupling and the first part.

4 Claims, 7 Drawing Sheets

HINGE ACTUATOR AND METHOD FOR ADJUSTING TWO PARTS OF A HINGE ACTUATOR RELATIVE TO EACH OTHER

CROSS-REFERENCE TO RELATED APPLICATION

This application is a continuation of U.S. patent application Ser. No. 12/472,935, filed May 27, 2009, which is a continuation of U.S. patent application Ser. No. 11/499,201, filed Aug. 4, 2006, now U.S. Pat. No. 7,547,855, which claims the benefit of PCT Application No. PCT/NL2005/000080, filed on Feb. 4, 2005, which claims benefit of Netherlands Application No. 1025434, filed Feb. 6, 2004, and Netherlands Application No. 1026014, filed Apr. 23, 2004, which applications are fully incorporated herein by reference.

TECHNICAL FIELD

The invention relates to a hinge actuator, including a hinge actuator for use in connection with a mirror adjustment mechanism for a wing mirror unit of a motor vehicle.

SUMMARY

The invention relates to a hinge actuator comprising a first part which is configured for connection with a second part via an electric drive, wherein the first and the second part are provided with stops cooperating in a pivoting direction for defining a select or predetermined position of the actuator parts with respect to each other, wherein further a coupling is provided between the first and the second part, so that in a first position of the coupling the first part and the second part are connected via the drive and can be pivoted relative to each other with the drive, and a second position in which the first part and the second part are not connected via the drive and can be pivoted relative to each other manually.

Such a hinge actuator is known, for instance, as used in a mirror adjustment mechanism for a wing mirror unit of a motor vehicle. The first part of the actuator is fixedly mounted on the motor vehicle. The second part supports a mirror housing and can pivot relative to the first part to the predetermined position, for instance a fold-in position to reduce the width of the vehicle, for instance after parking, or a fold-out position for use of the wing mirror unit under normal operating conditions. The predetermined position is defined by the stops cooperating in the pivoting direction, so that further pivoting is prevented.

The two parts of the hinge actuator can be pivoted both electrically and non-electrically, for instance manually. By the use of the coupling between the two parts, the electric drive can be uncoupled so that a pivoting movement of the wing mirror unit not caused by the drive, for instance upon manual pivoting, does not force any movements of the drive, and damage to the electric drive, such as fractures in a drive train or defects in an electric motor, can be prevented.

It is desired to define the predetermined position of the mirror housing so well that unintended pivoting back is prevented. As a consequence, the influence of external forces exerted on the mirror housing, such as air flowing along the wing mirror unit, for instance gusts of wind or driving wind, is reduced. By the provision of an additional pair of stops which cooperate in the predetermined position in an opposite pivoting direction, this problem could be mitigated. In order to enable electrical pivoting back from the predetermined position, the reaction force caused by the additional pair of stops should not exceed a predetermined level when pivoting electrically, since the drive must be able to overcome the reaction force.

In addition, however, it is desirable that the mirror housing, upon manual adjustment to the predetermined position, be secured in such a way that a clearly sensible coupling or 'click' can be felt and that the force that is needed to adjust the mirror housing further in the pivoting direction is of the same order of magnitude as the required force for pivoting the mirror housing in a direction opposite to the pivoting direction. To realize this, the reaction forces caused by the stops should be of the same order of magnitude in both directions. However, the electric drive then cannot adjust the mirror housing from the predetermined position, unless unacceptably powerful and costly electric motors are used, or the reaction forces caused by the stops are so slight that upon manual adjustment no resistance of significance is sensed.

An object of the invention is to provide a hinge actuator of the type mentioned in the opening paragraph hereof, in which, while preserving the advantages, the disadvantages mentioned are avoided. An object of the invention is to obtain a hinge actuator where, in the case of manual operation, a clearly sensible coupling can be sensed upon the predetermined position being reached, and where, with the aid of the electric drive, still pivoting movement from the predetermined position in the opposite pivoting direction is possible. To that end, the first and the second part of the hinge actuator are furthermore provided with stops only cooperating in the second position of the coupling in an opposite pivoting direction, for defining the predetermined position.

As the stops cooperating in the opposite pivoting direction are only active in the second position of the coupling, in which the first part and the second part are not connected via the drive, what is achieved is that the stops cooperating in the opposite pivoting direction, upon manual operation can cause a reaction force which is of the same order of magnitude as the reaction force caused by the stops cooperating in the pivoting direction. As a result, upon manual operation, a clear coupling is sensible. Moreover, the electric drive can still pivot the first part relative to the second part in the opposite pivoting direction, also from the predetermined position, since the stops cooperating in the opposite pivoting direction are not active in the first position of the coupling, in which the electric drive can pivot the first and second parts relative to each other.

Also with manual operation, in case of external forces on the hinge actuator, such as wind, undesired pivoting movement is prevented, since a powerful coupling in the predetermined position has been obtained.

Preferably, the first part of the hinge actuator comprises a base plate, provided with a base shaft, while the second part comprises a supporting frame extending around the base shaft for supporting a mirror housing, so that the hinge actuator can be used in a mirror adjustment mechanism for a wing mirror unit of a motor vehicle.

By designing the coupling with a coupling ring which is disengageably rotation-coupled and axially movable relative to the base shaft, the first and the second position can be defined in a relatively simple manner. The coupling ring can, for instance, be disengageably rotation-coupled with the base shaft by means of a cam construction which permits a pivoting movement upon the occurrence of an external couple greater than a pre-set level. Due to the fact that the rotation coupling of the coupling ring then disengages, the coupling ring also moves axially from a first axial position which defines the first position to a second axial position which defines the second axial position. When upon pivoting of the first part relative to the second part of the hinge actuator the coupling re-engages, the coupling ring moves back again to the first axial position. Of course, for reliably defining the axial positions of the coupling ring, also other disengageable constructions can be used, such as, for instance, roller elements in guide tracks.

By designing the stops cooperating in the opposite pivoting direction in such a way that the occurring reaction forces are in the same order of magnitude as the reaction forces occurring upon cooperation of the stops in the pivoting direction, what is achieved is that upon manual adjustment of the hinge actuator a clear coupling can be sensed upon the predetermined position being reached. The force that is needed for pivoting further or back is then in the same order of magnitude.

Advantageously, the hinge actuator can be provided with a switch-off mechanism for switching off the drive, whereby the force needed to overcome the stops cooperating in the opposite pivoting direction is in the same order of magnitude as the force at which the drive is switched off by the switch-off mechanism. What is thereby achieved is that the electric drive upon the predetermined position being reached, switches off automatically, so that the drive is not unduly loaded and premature wear is prevented. Since the required force for switching off is tuned to the same order of magnitude as the force that is required to overcome the stops cooperating in the opposite pivoting direction with manual operation, the user will upon manual adjustment of the hinge actuator experience a clear coupling upon the predetermined position being reached. As desired, the required force for removing the coupling is then of the same order of magnitude in both directions.

Preferably, the cooperating stops are formed by at least one cam which is arranged on the supporting frame for traversing a path during the pivoting movement of the supporting frame, and at least one first stop positioned fixedly with respect to the base shaft, and wherein the stops cooperating in an opposite pivoting direction are formed by the cam which is arranged on the supporting frame and at least one second stop arranged so as to be axially movable with respect to the base shaft. In this way, the cam on the supporting frame cooperates elegantly with both the first stop which prevents pivoting in the pivoting direction, and the second, movable stop which prevents pivoting movement in the opposite pivoting direction when the coupling is in the second position.

The invention also relates to a method for adjusting two parts of a hinge actuator relative to each other.

Further advantageous embodiments of the invention are represented in the subclaims.

The invention will be further elucidated on the basis of exemplary embodiments which are represented in the drawing. In the drawings.

The figures are only schematic representations of preferred embodiments of the invention. In the figures, the same or corresponding parts are indicated with the same reference numerals.

Figure 1:
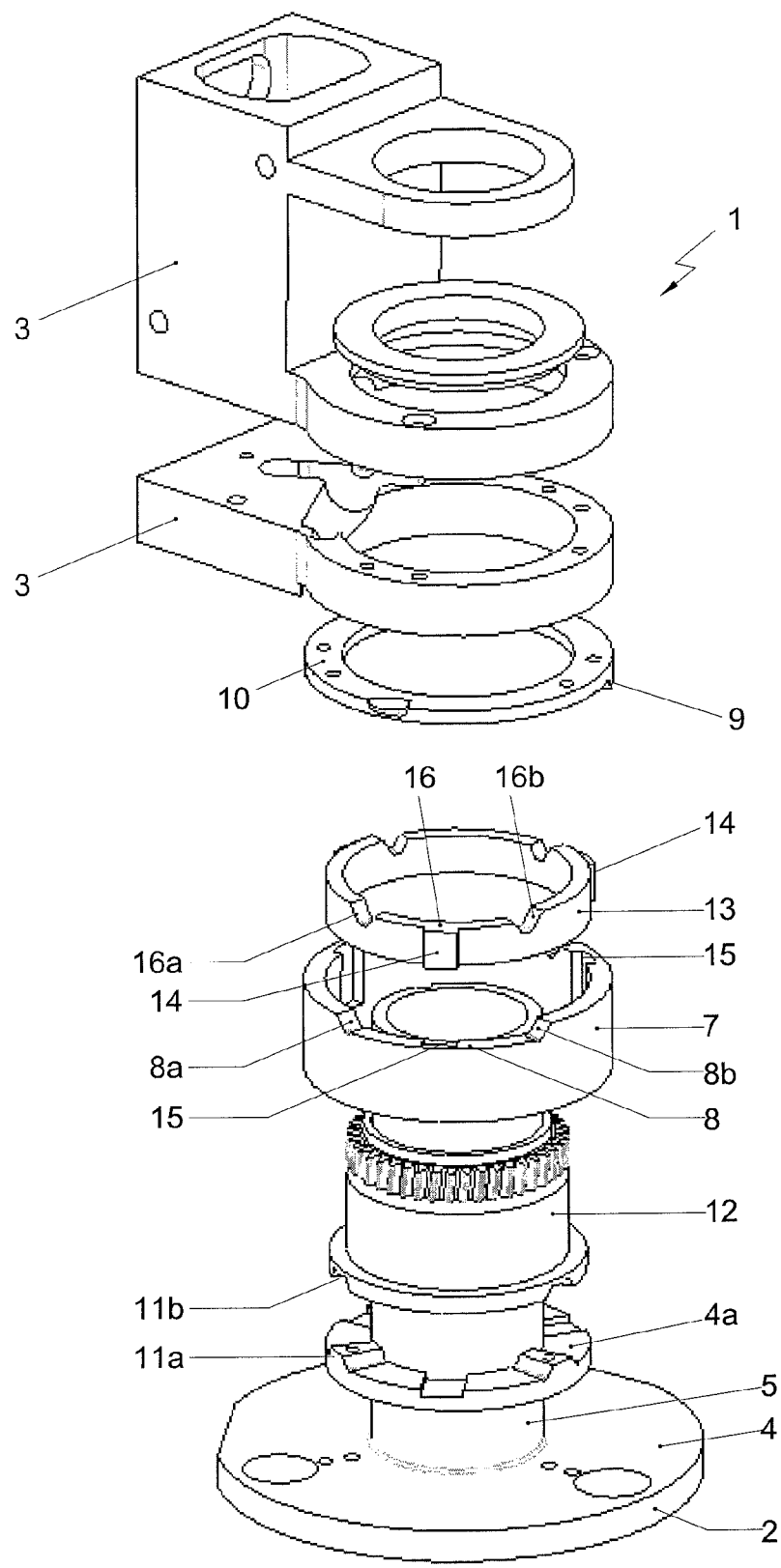
FIG. 1 is a first perspective view of a hinge actuator according to the invention in disassembled condition.
Figure 2:
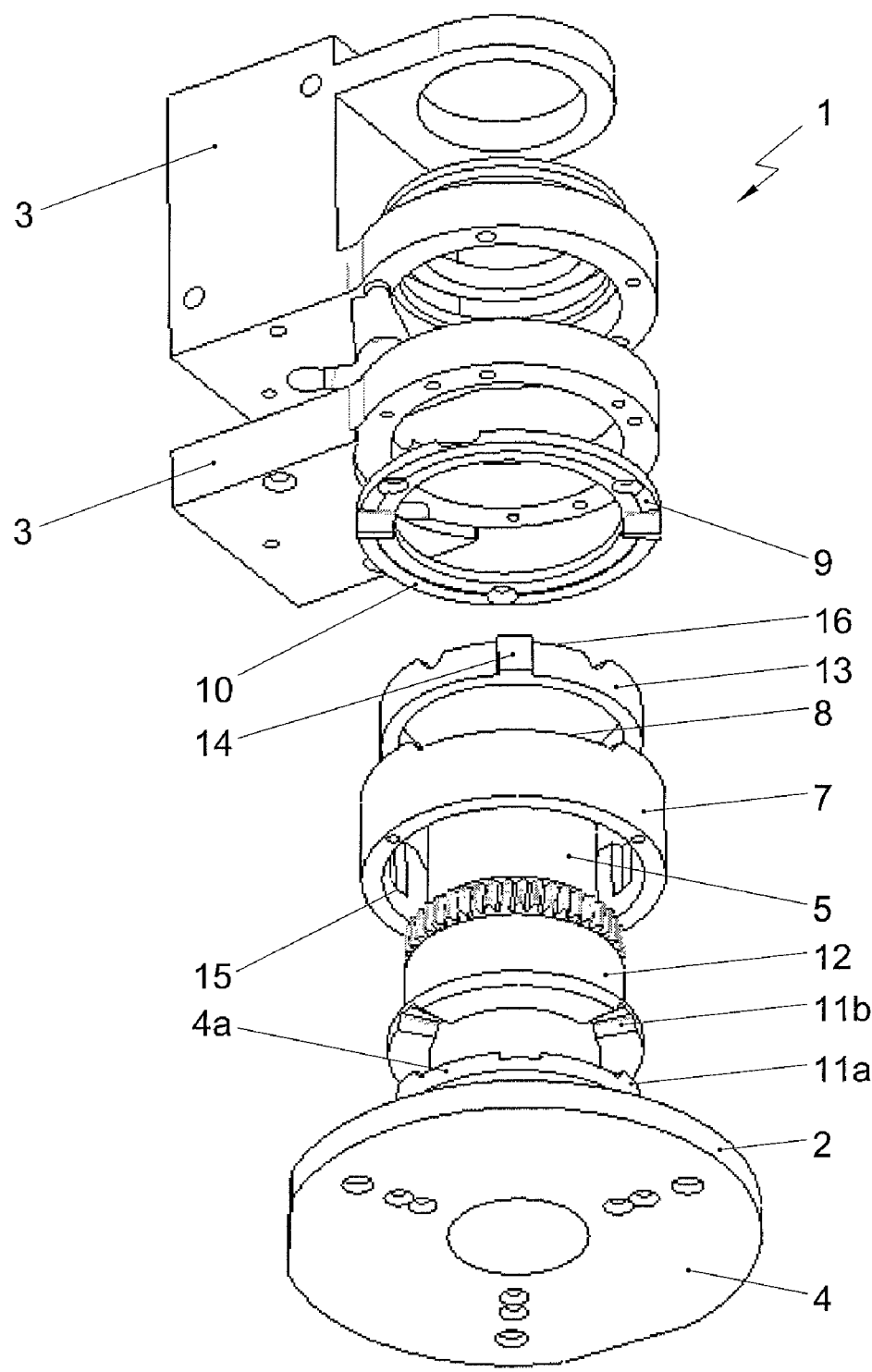
FIG. 2 is a second perspective view of the hinge actuator of FIG. 1.

FIGS. 1 and 2 show a preferred embodiment of a hinge actuator 1. The hinge actuator 1 has a first part, designed as a base part 2, and a second part, designed as a supporting frame 3, which parts can pivot relative to each other. The base part 2 can be fixedly connected to a motor vehicle, and has a base flange 4 on which a fixed base shaft 5 is arranged. The base shaft 5 extends along a geometric pivoting axis A of substantially upstanding orientation. The supporting frame 3 is built up from modules fixedly attached to each other and extends around the base shaft 5 and can support a mirror housing which accommodates a mirror glass, so that the whole can serve as a wing mirror unit of a motor vehicle. During pivoting of the hinge actuator 1, the supporting frame 3 hinges about the base shaft 5.

Arranged on the base flange 4 is a base ring 7 which likewise extends around the base shaft 5. The side of the base ring 7 remote from the base flange 4 is at least partly formed as a first cam track 8 to be traversed by a cam 9 which is fixedly attached to the supporting frame 3 via a cam ring 10. The cam track 8 comprises a substantially planar portion which is bounded at the ends by two inclined butting faces 8a, 8b which form stops cooperating with the cam 9 in a pivoting direction for defining a predetermined position of the actuator parts relative to each other, such as a fold-in position of the wing mirror unit which is suitable for performing parking maneuvers and a fold-out position for normal use of the motor vehicle in traffic.

The supporting frame 3 accommodates an electric motor, not shown, and a drive train coupled thereto, which constitute the drive of the hinge actuator. The drive train is further adapted to be coupled with the coupling ring designed as gear wheel 12, which constitutes a coupling between the drive and a driven part of the actuator 1. The gear wheel 12 encloses the base shaft 5 and is arranged so as to be axially movable relative thereto and further, in a first position situated near the base flange 4, restrained from rotation relative to the base shaft 5. With the aid of a biased spring element, not shown, the gear wheel 12 is driven in the direction of the base flange 4. The gear wheel 12 is in engagement with an output part of the drive train, so that the hinge actuator 1 can be adjusted with the drive.

Figure 4:
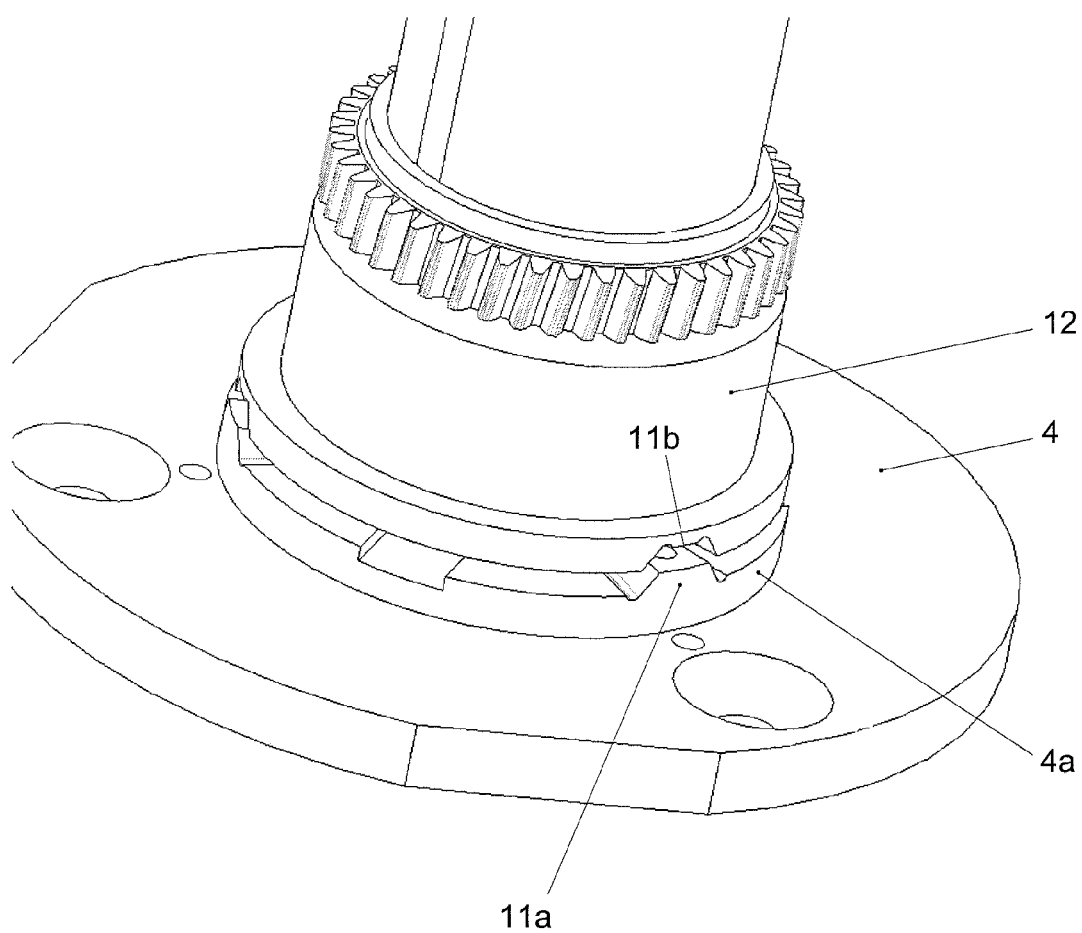
FIG. 4 is a perspective view of a gear wheel and a base flange of the hinge actuator of FIG. 1.

During manual operation of the hinge actuator 1, the lock against rotation of the gear wheel 12 with respect to the base shaft 5 is disengaged by the externally applied force, for instance by uncoupling a cam construction 11 arranged between the base flange 4 and the gear wheel 12, as shown in more detail in FIG. 4. The cam construction 11 comprises at least one cam 11a and a cam track 11b which are respectively provided on a flange ring 4a which is restrained from rotation relative to the base flange 4, and on the gear wheel 12, or vice versa. As a result, the gear wheel 12 moves axially, against the spring action of the spring element, from the first position to a second position, situated farther from the base flange 4, in which the gear wheel 12 is freely rotatable relative to the base shaft 5. In the second position of the gear wheel 12, the supporting frame 3 can be manually pivoted relative to the base shaft 5. This enables a manual pivoting of the wing mirror unit relative to the motor vehicle without forcing movements of the drive. Upon subsequent switching on of the electric drive, the gear wheel 12 couples with the base flange 4, so that electric adjustment is possible again.

Figure 3:
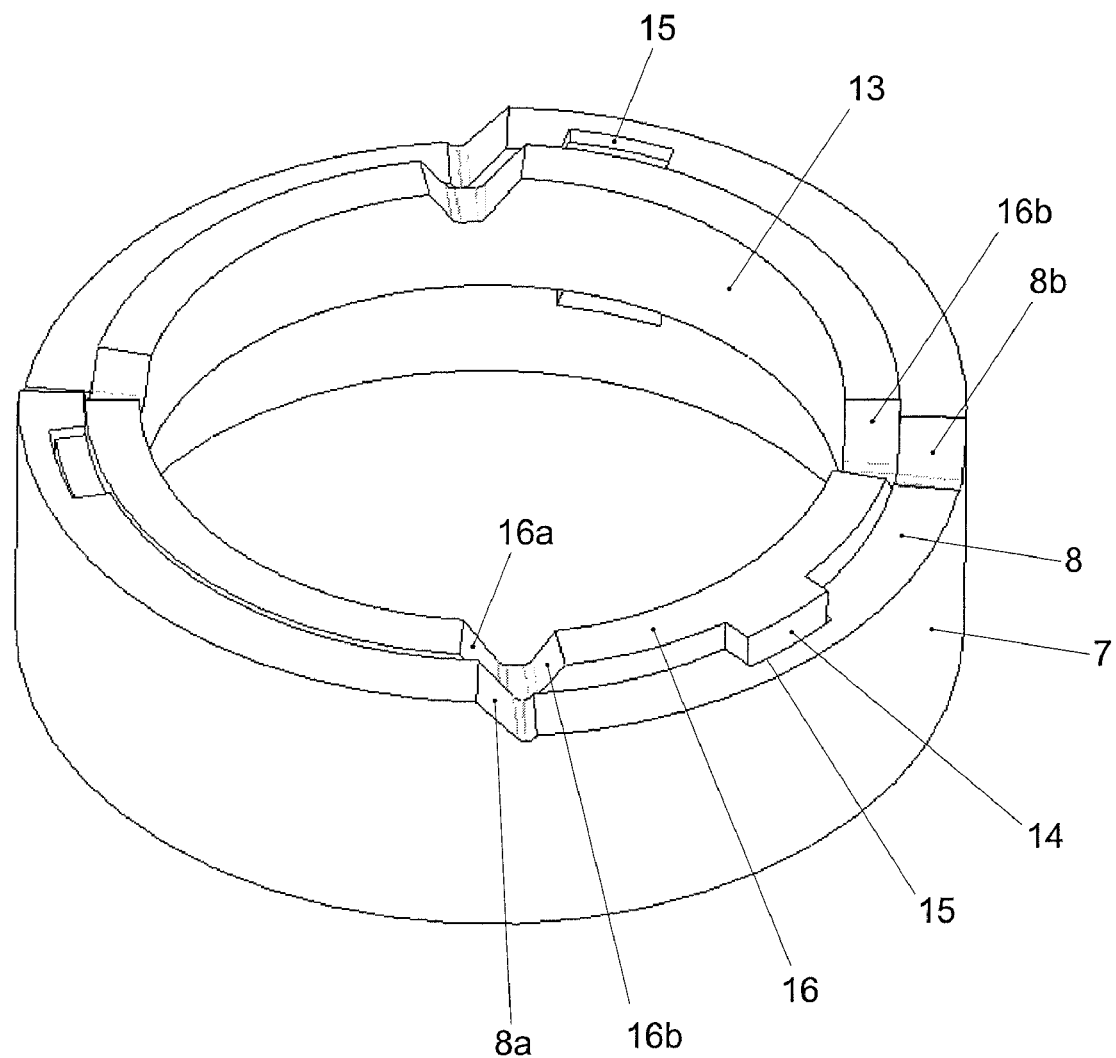
FIG. 3 is a perspective view of a base ring and an auxiliary ring of the hinge actuator of FIG. 1.

The hinge actuator 1 furthermore comprises an auxiliary ring 13 which encloses the base shaft 5 and, under spring action of the spring element, abuts against the gear wheel 12. The auxiliary ring 13 is shown in more detail in FIG. 3 and, with the aid of cams 14 and recesses 15, is axially movable, though restrained from rotation relative to the base ring 7, so that the auxiliary ring 13 can follow the axial movements of the gear wheel 12. The side of the auxiliary ring 13 remote from the base flange 4 is at least partly formed as a second cam track 16 to be traversed by the cam 9 arranged on the supporting frame 3. The second cam track has inclined butting faces 16*a*, 16*b*, so that pivoting of the supporting frame 3 from the predetermined position in the opposite pivoting direction is prevented.

When the gear wheel is in the first position, the hinge actuator 1 can be adjusted with the aid of the electric drive. The cam 9 of the supporting frame 3 then traverses a path which is defined by the first cam track 8, since the second cam track cannot come into contact with the cam 9 in the first position of the gear wheel 12. Upon reaching a butting face 8*a*, 8*b* of the first cam track 8, the cam 9 forms therewith a pair of stops cooperating in the pivoting direction, causing a reaction force whereby the electric motor 10 switches off in the predetermined position. The hinge actuator can pivot back electrically by activating the electric motor 10 in the opposite pivoting direction.

As described above, manual adjustment of the actuator is possible by bringing the gear wheel 12 in the second position, as a result of which the electric drive is uncoupled. The gear wheel 12 further pushes the auxiliary ring 13 in the direction directed away from the base flange 4, so that the second cam track 16 can also limit the path of the cam 9. Upon manual pivoting of the hinge actuator 1, the cam 9 will again form, together with a butting face 8*a*, 8*b* of the first cam track 8, a pair of stops cooperating in the pivoting direction, thereby preventing further pivoting in the pivoting direction. The occurring reaction forces are a signal to the user that further pivoting is probably undesired, because a position which is desired for the user of the motor vehicle has already been obtained or because further pivoting is not possible in terms of construction technique. Also pivoting back is now prevented by the cam 9 which, together with a butting face 16*a*, 16*b* of the second cam track 16, forms a pair of stops cooperating in the opposite pivoting direction. As a result, the person performing the pivoting movement experiences a clearly noticeable coupling in the predetermined position of the supporting frame 3 with respect to the base shaft 5. Owing to the specific shape and dimensions of the butting faces 8*a*, 8*b*, 16*a*, 16*b*, the required force to overcome the two pairs of cooperating stops is in the same order of magnitude. The cam 9 is oriented so broadly that cooperation with the butting faces of both the first and the second cam track 8, 16 is possible. Instead of one integrated cam 9, however, two cams may be arranged which, if desired, can include an angle relative to each other. Also in the case of other pivoting movement of the hinge actuator, not caused by the drive, for instance upon contact with a foreign object, such as a pillar, the above-outlined interplay of forces occurs.

The hinge actuator 1 furthermore comprises a current limiting circuit which serves as a switch-off mechanism. When, upon the supporting frame 3 and the base shaft 5 reaching the predetermined position, the electric current in the electric motor increases in order to generate a sufficient couple, the current limiting circuit switches off the electric motor at a predetermined current intensity, so that damage to the electric motor is prevented. The butting faces 16*a*, 16*b* of the second cam track 16 are so designed that overcoming the reaction forces caused with the cam 9 in the predetermined position of the hinge actuator would generate such a large current in the electric motor that the current limiting circuit would enter into operation and switch off the electric motor.

Optionally, the hinge actuator may furthermore be provided with a resilient ring for driving the auxiliary ring in the direction of the base flange in order to prevent stops being able to cooperate in the opposite pivoting direction when the first and second part of the actuator are connected with each other via the drive.

Figure 5:
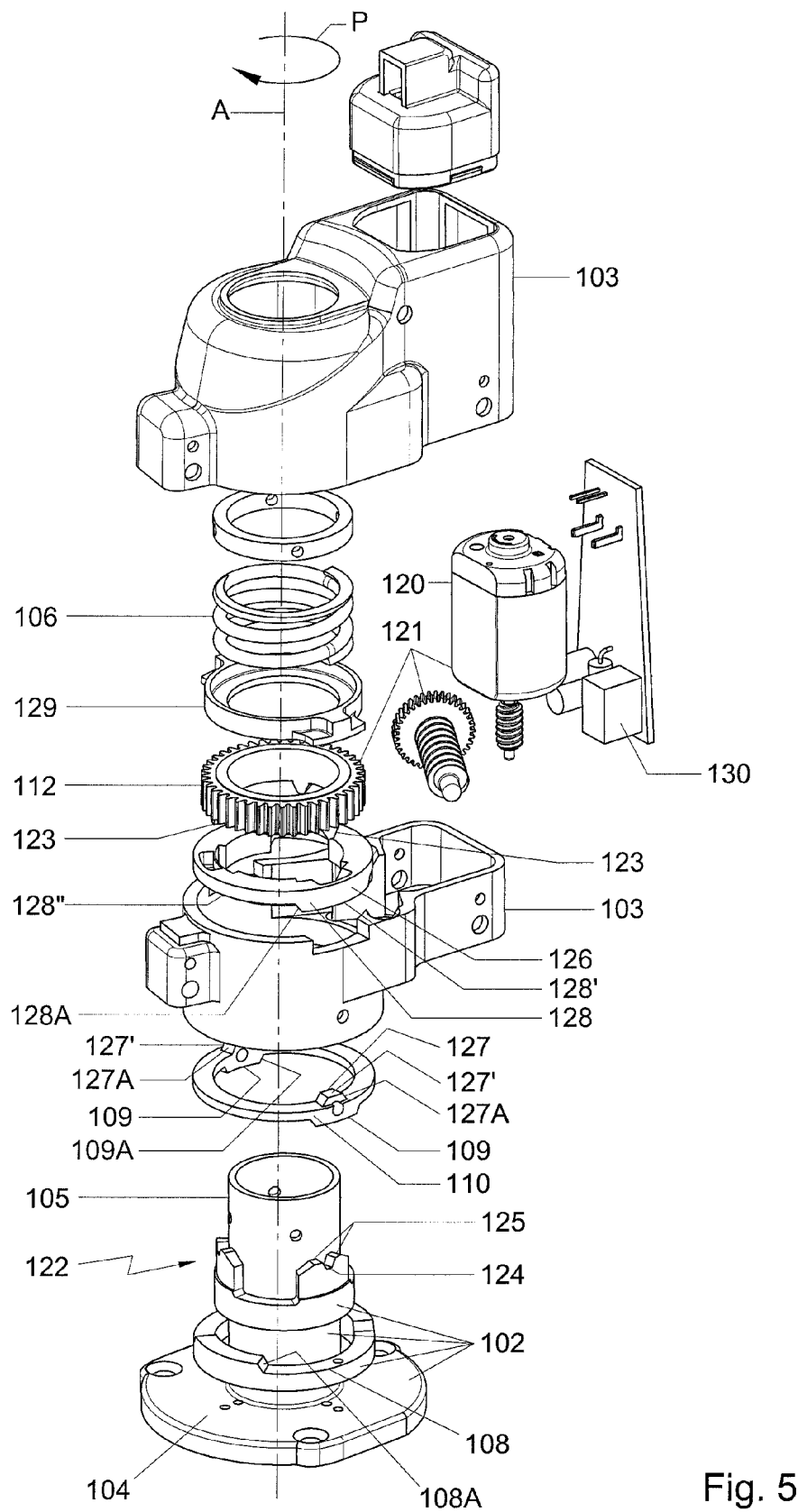
FIG. 5 is a schematic perspective view of an alternative embodiment of the hinge actuator in disassembled condition.
Figure 6:
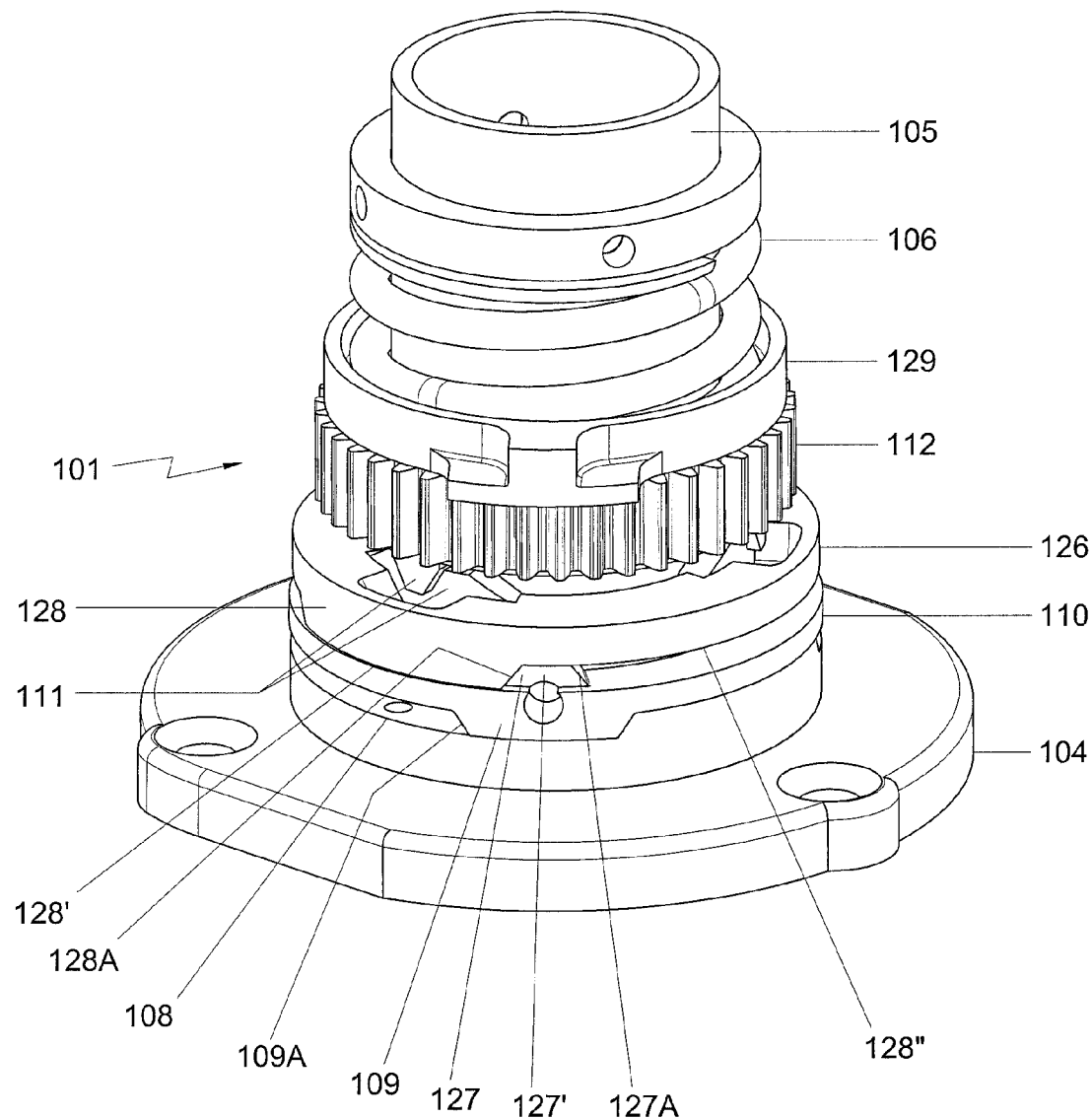
FIG. 6 is a schematic perspective view of the hinge actuator of FIG. 5 in assembled condition with the coupling in the first position.
Figure 7:
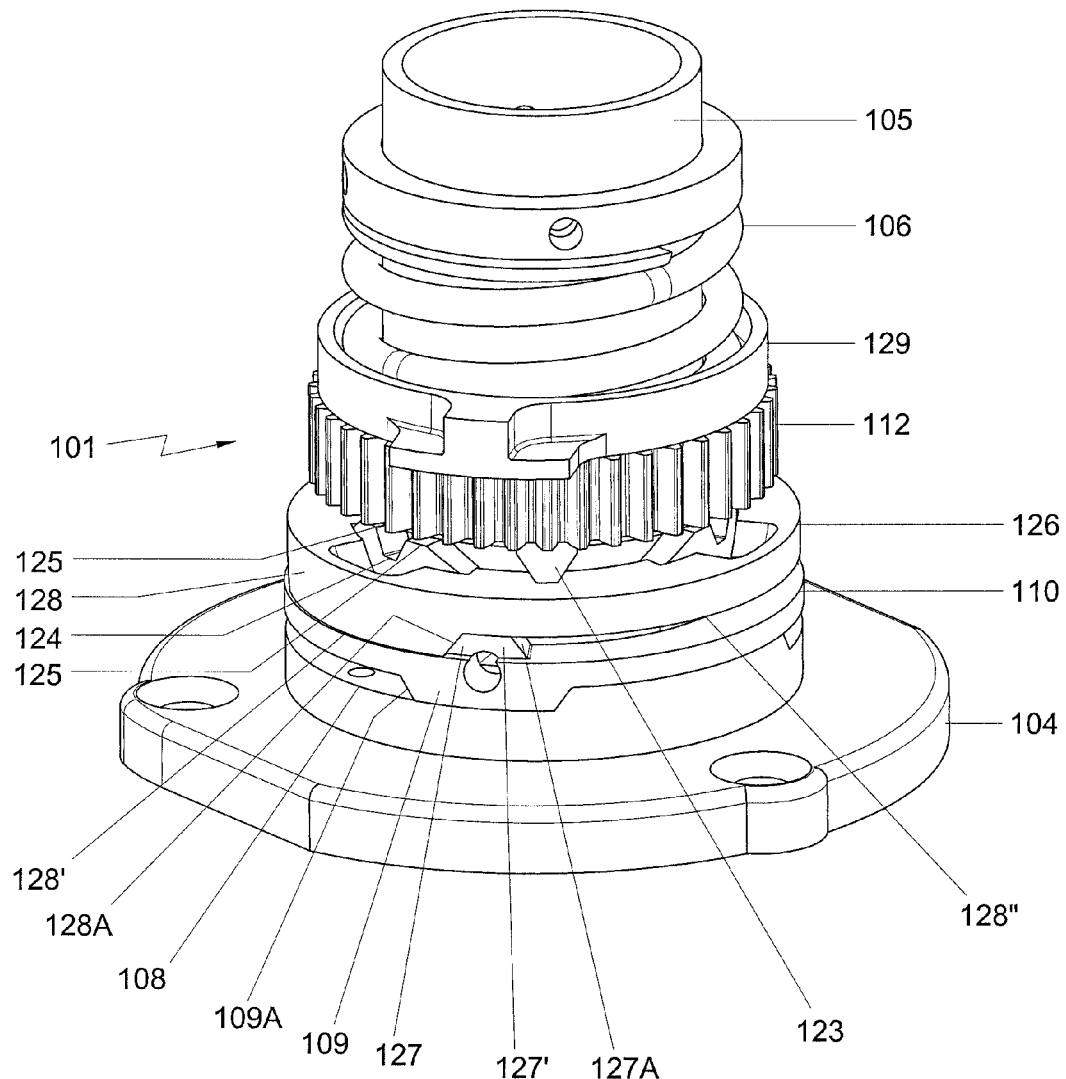
FIG. 7 is a schematic perspective view of the hinge actuator of FIG. 6 in assembled condition with the coupling in the second position.

FIGS. 5, 6 and 7 show an alternative preferred embodiment of the hinge actuator 101. The hinge actuator 101 has a first part, designed as a base part 102, and a second part, designed as a supporting frame 103, which parts can pivot relative to each other. The base part 102 can be fixedly connected to a motor vehicle, and has a base flange 104 on which a fixed base shaft 105 is arranged. The supporting frame 103 is built up from modules fixedly mounted on each other, extends around the base shaft 105 and can support a mirror housing in which a mirror glass is included, so that the whole can serve as a wing mirror unit of a motor vehicle. During pivoting of the hinge actuator 101, the supporting frame 103 hinges about the base shaft 105.

Formed on the base flange 104 is a cam track 108 which can be traversed by a cam 109 which is fixedly mounted on the supporting frame 103. In the figure, for the sake of clarity, this part of the base frame is represented as a separate cam ring 110. It will be clear that the cam ring 110 may be integrated with the bottom of the supporting frame 103. The cam track 108 comprises a substantially planar portion which is bounded at the ends by an inclined butting face 108*a* which cooperates in the pivoting direction indicated by the arrow P with a corresponding stop surface 109*a* of the cam 109. The stop surfaces 108*a*, 109*a* form cooperating stops for defining in a first pivoting direction a predetermined position of the actuator parts 102, 103 with respect to each other. In the figure, this is represented as a fold-out position of the wing mirror unit during normal use of the motor vehicle in traffic, which is defined in the fold-out direction.

Included in the supporting frame 103 is an electric motor 120 with a drive train 121 coupled to it, which constitute the drive of the hinge actuator. The output part of the drive is formed as a gear wheel 112 which is arranged as a coupling ring around the base shaft 105. The gear wheel 112 and the base shaft 105 together constitute a coupling 111 so that, in the first position of the coupling, the base part 102 and the supporting frame 103 are connected via the drive and can be pivoted relative to each other with the drive, and in a second position, the base part 102 and the supporting frame 103 are not connected via the drive and can be pivoted relative to each other manually.

The gear wheel 112 encloses the base shaft 105 and is so arranged as to be axially movable relative thereto. In a first position, situated axially closer to the base flange 104, the gear wheel 112 is further restrained from rotation, that is, rotation-coupled with respect to the base shaft 105.

During application of an external force on the hinge actuator 101, as in the case of manual operation, the lock against rotation of the gear wheel 112 relative to the base shaft 105 can be disengaged by uncoupling the coupling 111 between the gear wheel 112 and the base shaft 105.

To that end, the coupling 111 comprises, on the one hand, three two-topped profiles 122 arranged on the circumference of the base shaft 105 and, on the other hand, cams 123 reaching downwards with respect to the gear wheel 112 for cooperation with the two-topped profiles. In the first position of the coupling, the gear wheel 112, in a first axial position, is supported axially on the base shaft 105 and locked against rotation in that the cams 123 are each lodged in valleys 124 between tops 125 of the two-topped cam track profiles 122. In the first position of the coupling 111, the gear wheel 112 is axially movable from a first axial position, in an axial direction directed away from the base flange 104, to a second axial position.

When under the influence of an external force the supporting frame 103 is rotated about the base shaft 105, the gear wheel 112 is carried along by the drive train 121, and the cams 123 are guided axially upwards via the flanks of the tops 125 contiguous to the valley 124. After passing the tops 125, the cams will be guided downwards under the action of a coil spring 106 arranged around the base shaft 105, along the inclined flanks of the two-topped profile 122 remote from the valleys, down onto a top surface of an auxiliary coupling ring 126 arranged around the base shaft 105 between the gear wheel 112 and the supporting frame 103, so that the gear wheel 112 reaches a second axial position in which it is freely rotatable relative to the base shaft 105. The function of the auxiliary coupling ring 126 will be further elucidated hereinafter.

The coupling 111 enables a manual pivoting of the wing mirror unit relative to the motor vehicle without forcing movements of the drive.

By the use of the coupling 111, the supporting frame 103 can therefore be pivoted around the base part through both electric drive and manual operation. The fold-out position is then defined in a first pivoting direction, i.e. towards the fold-out position, by cooperation of the stop surfaces 708*a*, 709*a*.

During pivoting in the first direction towards the fold-out position, the electric operation can be switched off with the aid of a current limiting circuit 130. When, upon reaching the predetermined position of the supporting frame 103 through cooperation of the stops 108*a*, 109*a*, the electric current in the electric motor increases, the current limiting circuit 130 switches off the electric motor at a predetermined current intensity, thereby preventing damage to the electric motor or drive train.

Under the influence of an external force, the cooperating stops 108*a*, 109*a* can be overcome against the action of the spring 106, so that the base frame 103 can be pivoted further in the direction of the arrow P to a fold-over position. The supporting frame 103 can then be pivoted back both with the aid of the electric drive and manually.

When the first and the second part are connected via the drive, the fold-out position is defined in the opposite pivoting direction in that the drive prevents pivoting.

For defining the fold-in position in the case of manual operation in the opposite pivoting direction, i.e. in the inward pivoting direction, the hinge actuator 101 is equipped with an auxiliary coupling ring 126 which is arranged around the base shaft 105. The auxiliary coupling ring 126 is arranged between the gear wheel 112 and the supporting frame 103. The auxiliary coupling ring 126 and the mirror supporting frame 103 are provided with auxiliary stops 127,128 cooperating only in the second position of the coupling 111 in the opposite pivoting direction. These auxiliary stops therefore constitute the stops for defining the predetermined position in the opposite pivoting direction. The auxiliary coupling ring 126 is arranged around the base shaft 105 so as to be axially movable and rotation-coupled. The auxiliary stops 128 are formed by stop surfaces 128*a* on two cam tracks 128' which are provided on the undersurface of the auxiliary coupling ring 126. The auxiliary stops 127 are formed by stop surfaces 127*a* which are provided on two upwardly reaching cams 127' on the supporting frame 103. As will be elucidated hereinafter, the cam tracks 128' and the cams 127' cooperate to define the fold-out position in the fold-in direction when as a result of an externally applied force the coupling is in the second position, and the cams 123 of the gear wheel 112 therefore rest on the top surface of the auxiliary coupling ring 126. It will be clear that the cams 127' and the cam tracks 128 can also be interchanged.

The hinge actuator 101 further comprises an intermediate ring 129, arranged around the base shaft, which is under axial action of the spring 106. In a first position of the coupling 111, the intermediate ring 129 is supported directly on the supporting frame 103. In the second position of the coupling 111, the upper surface of the gear wheel 112 is in the second position, which is situated axially farther from the base flange 104 than the first position. The intermediate ring 129 is then supported on the upper surface of the gear wheel 112. As a result, when the gear wheel 112, as described above, has been brought into the second position upon manual pivoting of the supporting frame 103, the auxiliary coupling ring 126 will become subject to spring action. What is thus achieved is that in the first position of the coupling, in which the gear wheel 112 is supported on the base shaft 105 while the auxiliary coupling ring is freely movable with limited travel, the cam tracks 128' on the auxiliary coupling ring 126 do not cooperate under spring action with the cam tracks 127'. As a result, the stop surfaces 127*a*, 128*a* will not cooperate as stops during electrically-driven inward pivoting from the fold-out position. Upon electrically-driven inward pivoting, the auxiliary coupling ring 126 will be moved axially upwards and permit pivoting without resistance of significance.

What can optionally be achieved by providing a slight friction between the auxiliary coupling ring 126 and the base shaft 105, is that the stop surfaces 127*a*, 128*a* are axially spaced apart during normal (electric) operation and hence do not touch upon being pivoted relative to each other.

In the second position of the coupling, however, the auxiliary coupling ring 126 is under downward spring action via the gear wheel 112, which is now in the second position. The auxiliary coupling ring 126 transmits the spring force to the supporting frame 103, viz. in that the auxiliary cam 127' is pressed onto the auxiliary cam track 128'. When the supporting frame is pivoted further to the predetermined position, the auxiliary cam 127' will follow the auxiliary cam track 128' and be guided along auxiliary stop surface 128*a* to a higher supporting surface 128" of the cam track 128'.

As a result, the auxiliary coupling ring 126, together with the gear wheel 112, will undergo a downward movement, i.e. towards the base flange 104. In the process, however, the two preferably remain under spring action. The downward movement is limited in that the stop surfaces 127*a* and 128*a* cooperate in the opposite pivoting direction, and also in that stop surfaces 127*a* of auxiliary cams 127' and supporting surfaces 128" of the cam tracks 128'cooperate, so that eventually the predetermined position is defined. As the fold-out position is approached during folding out, this will be experienced by the pivoting person as a clear 'click'.

After a manual pivoting to the fold-out position as described above, then, upon manual operation in the opposite pivoting direction, first the stops 127, 128 will have to be overcome against the action of the spring 106, so that a clear 'click' can be felt again. The auxiliary coupling ring 126 is then pressed upwards, together with gear wheel 112, against the spring action. In this way, therefore, it is possible upon manual operation to feel a clear 'click' both upon outward pivoting to the fold-out position and upon pivoting back from the fold-out position, while this 'click' can remain absent in the case of electrical pivoting back.

The invention is not limited to the exemplary embodiments described here. Many variants are possible.

Thus, the coupling ring designed as gear wheel can be designed differently, for instance as a ring which constitutes a disengageable coupling between a driven part of the electric drive and a first or second part of the hinge actuator.

Also, the cam may be fixed on the base ring, with butting faces provided on the supporting frame and the auxiliary ring. The auxiliary ring is then locked against rotation with respect to the supporting frame. Furthermore, the cam tracks and the cam can be of eccentric or other design.

Furthermore, the switch-off mechanism, instead of being designed as a current limiting circuit, can also be designed with the aid of a different mechanism, for instance with the aid of a friction coupling.

Such variants will be clear to those skilled in the art and are understood to fall within the scope of the invention as set forth in the following claims.

What is claimed is:

1. A hinge actuator comprising:
   a first part;
   a second part;
   an electric drive, the first part configured for connection to the second part via the electric drive;
   a coupling provided between the first part and the second part such that in a first position the first part and the second part are connected via the drive and can be pivoted relative to each other via the drive, and in a second position the first part and the second part are not connected via the drive and can be pivoted relative to each other manually; and
   an auxiliary coupling;
   wherein first stops are included on the coupling and the auxiliary coupling, and second stops are included on the coupling and the first part; the first and second stops only cooperate in the second position of the coupling in an opposite pivoting direction and are configured to define a select or predetermined position, the first and second stops are not active in the first position of the coupling, and the first and second stops are only active in the second position of the coupling.

2. The hinge actuator according to claim 1, wherein the first stops and second stops are configured in the opposite pivoting direction so that occurring reaction forces associated with their cooperation are in the same order of magnitude as occurring reaction forces associated with their cooperation in the pivoting direction.

3. The hinge actuator according to claim 1, further comprising a switch-off mechanism for switching off the electric drive, wherein the force for overcoming the first stops is at least the same order of magnitude as the force at which the drive is switched off by the switch-off mechanism.

4. The hinge actuator according to claim 3, wherein the switch-off mechanism comprises a current limiting circuit, and the electric current of the circuit for overcoming the first stops is at least the same order of magnitude as the current at which the current limiting circuit switches off the drive.

* * * * *